United States Patent
Li et al.

(10) Patent No.: US 11,897,344 B2
(45) Date of Patent: Feb. 13, 2024

(54) RISK EARLY WARNING METHOD AND SYSTEM FOR HYDROGEN LEAKAGE

(71) Applicant: BEIJING INSTITUTE OF TECHNOLOGY, Beijing (CN)

(72) Inventors: Jianwei Li, Beijing (CN); Zhonghao Tian, Beijing (CN); Xinming Wan, Beijing (CN); Hongwen He, Beijing (CN); Fengchun Sun, Beijing (CN); Wenjun Guo, Beijing (CN); Zhanxin Mao, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 18/212,143

(22) Filed: Jun. 20, 2023

(65) Prior Publication Data
US 2023/0406108 A1    Dec. 21, 2023

(30) Foreign Application Priority Data
Jun. 20, 2022 (CN) .......................... 202210694031.6

(51) Int. Cl.
*F02C 9/46* (2006.01)
*B60L 3/04* (2006.01)

(52) U.S. Cl.
CPC ..................................... *B60L 3/04* (2013.01)

(58) Field of Classification Search
CPC .............. F02C 9/46; F02C 7/22; F01D 21/12
USPC ............................................................. 436/3
See application file for complete search history.

(56) References Cited

U.S. PATENT DOCUMENTS

2022/0307428 A1* 9/2022 Sibbach .................... F02C 3/22

FOREIGN PATENT DOCUMENTS

| CN | 112918259 A   | 6/2021  |
|----|---------------|---------|
| CN | 112966378 A   | 6/2021  |
| CN | 113988552 A   | 1/2022  |
| JP | 2009287665 A  | 12/2009 |

OTHER PUBLICATIONS

First Office Action dated Jul. 29, 2022, in related Chinese Patent Appl. No. 202210694031.6, 11 pages.
Wang, Q. et al. "Numerically Analysis for the Hydrogen Dispersion and Distribution Behaviors in the Fuel Cell Bus", SAECCE2021-EV077, pp. 389-395, 2021.

* cited by examiner

*Primary Examiner* — Danny Nguyen
(74) *Attorney, Agent, or Firm* — Bochner PLLC; Andrew D. Bochner (57) ABSTRACT

The present disclosure relates to a risk early warning method and system for hydrogen leakage, and relates to the field of hydrogen leakage. The method includes: obtaining ventilation information of a hydrogen-related area; carrying out grid division on a pipeline system of the hydrogen-related area to obtain a gridded pipeline system; determining a risk coefficient corresponding to each grid of the gridded pipeline system according to leakage sources of the pipeline system; determining a high-risk region by means of a jet cone model according to the risk coefficients; determining a medium-risk region, a low-risk region and a safe region according to the risk coefficients and the ventilation information; and carrying out risk early warning according to the high-risk region, the medium-risk region, the low-risk region and the safe region.

3 Claims, 7 Drawing Sheets

RISK EARLY WARNING METHOD AND SYSTEM FOR HYDROGEN LEAKAGE

CROSS REFERENCE TO RELATED APPLICATION

This patent application claims the benefit and priority of Chinese Patent Application No. 202210694031.6, filed with the China National Intellectual Property Administration on Jun. 20, 2022, the disclosure of which is incorporated by reference herein in its entirety as part of the present application.

TECHNICAL FIELD

The present disclosure relates to the field of hydrogen leakage, and particularly to a risk early warning method and system for hydrogen leakage.

BACKGROUND

Hydrogen energy, a type of clean and pollution-free green energy with high energy density, can largely solve the problems of energy waste and environmental pollution when applied in a large scale. However, as a micro-molecular gas extremely special in physical and chemical properties, hydrogen is likely to leak, diffuse, and accumulate in inadequately ventilated sites. If so, the accumulated hydrogen will reach a combustion and explosion limit soon, causing high possibility of combustion and explosion accidents. In practical application scenarios, weld seams, rusted positions and valve openings of hydrogen storage vessels and pipelines, where cracks, leakage and accumulation are likely to occur, are regarded as high-risk regions. They require special supervision and protection. Depending on a speed of hydrogen accumulation and a severity degree of gas accumulation, the entire space regions should be divided into different risk levels, so as to guide safety deployment. Currently, thorough research in this field is absent, and researches on safety distances and risk regions mainly focus on related researches on engineering construction and safety evacuation. Generally, safety alerts for risky gases are divided simply according to a single variable, risky gas concentration. Division of risk regions into merely a safe region and a risky region is inaccurate, and will cause false early warning. Sometimes, sensors are directly arranged for supervision. But since it is rare to systematically analyze risk degrees of different spaces and then pertinently formulate alarm solutions, an effect of an alarm system cannot be fully exerted. In view of that, an accurate and reasonable risk region division method is urgently required to reduce the risk of false risk early warning.

SUMMARY

An objective of the present disclosure is to provide a risk early warning method and system for hydrogen leakage. A plurality of levels of risk regions are divided according to a speed at which hydrogen reaches a deflagration concentration range, so as to improve accuracy of risk level division of the hydrogen-related area, and further improve accuracy of risk early warning.

In order to realize the above objective, the present disclosure provides a solution as follows:

a risk early warning method for hydrogen leakage includes:

obtaining ventilation information of a hydrogen-related area;

carrying out grid division on a pipeline system of the hydrogen-related area to obtain a gridded pipeline system;

determining a risk coefficient corresponding to each grid of the gridded pipeline system according to leakage sources of the pipeline system;

determining a high-risk region by means of a jet cone model according to the risk coefficients;

determining a medium-risk region, a low-risk region and a safe region according to the risk coefficients and the ventilation information; and carrying out risk early warning according to the high-risk region, the medium-risk region, the low-risk region and the safe region.

Alternatively, the determining a risk coefficient corresponding to each grid of the gridded pipeline system according to leakage sources of the pipeline system specifically includes:

obtaining risk coefficients of the leakage source in each grid of the gridded pipeline system; and taking a maximum risk coefficient of the leakage source in each grid as the risk coefficient corresponding to each grid.

Alternatively, the determining a high-risk region by means of a jet cone model according to the risk coefficients specifically includes:

determining hydrogen concentration distribution by means of the jet cone model according to the risk coefficients; and determining the high-risk region according to the hydrogen concentration distribution and the leakage sources.

Alternatively, the determining a medium-risk region, a low-risk region and a safe region according to the risk coefficients and the ventilation information specifically includes:

determining whether a top ventilation quantity in the ventilation information is greater than a gas volume of the high-risk region to obtain a first determination result;

determining, under the condition that the first determination result is yes, a region of the hydrogen-related area other than the high-risk region as the safe region;

determining, under the condition that the first determination result is no, the medium-risk region according to the risk coefficient and the ventilation information; and determining the low-risk region and the safe region according to the medium-risk region, the high-risk region, an internal gas volume of the hydrogen-related area and the ventilation information.

Alternatively, the determining the low-risk region and the safe region according to the medium-risk region, the high-risk region, an internal gas volume of the hydrogen-related area and the ventilation information specifically includes:

determining whether the top ventilation quantity and a non-top ventilation quantity synchronously exist in the ventilation information to obtain a second determination result;

determining, under the condition that the second determination result is no, a region of the hydrogen-related area other than the high-risk region and the medium-risk region as the low-risk region; and determining, under the condition that the second determination result is yes, the low-risk region and the safe region according to the internal gas volume of the hydrogen-related area and the ventilation information.

Alternatively, the determining the low-risk region and the safe region according to the internal gas volume of the hydrogen-related area and the ventilation information specifically includes:

determining a total ventilation quantity according to the top ventilation quantity and the non-top ventilation quantity in the ventilation information;

determining the low-risk region according to the total ventilation quantity and the risk coefficients; and determining the safe region according to the internal gas volume of the hydrogen-related area and the low-risk region.

A risk early warning system for hydrogen leakage includes:

an obtainment module configured to obtain ventilation information of a hydrogen-related area;

a grid division module configured to carry out grid division on a pipeline system of the hydrogen-related area to obtain a gridded pipeline system;

a risk coefficient determination module configured to determine a risk coefficient corresponding to each grid of the gridded pipeline system according to leakage sources of the pipeline system;

a high-risk region determination module configured to determine a high-risk region by means of a jet cone model according to the risk coefficients;

a medium-risk region, low-risk region and safe region determination module configured to determine a medium-risk region, a low-risk region and a safe region according to the risk coefficients and the ventilation information; and an early warning module configured to carry out risk early warning according to the high-risk region, the medium-risk region, the low-risk region and the safe region.

Alternatively, the risk coefficient determination module specifically includes:

an obtainment unit configured to obtain risk coefficients of the leakage source in each grid of the gridded pipeline system; and a risk coefficient determination unit configured to take a maximum risk coefficient of the leakage source in each grid as the risk coefficient corresponding to each grid.

According to particular embodiments provided in the present disclosure, the present disclosure discloses technical effects as follows:

according to the present disclosure, ventilation information of a hydrogen-related area is obtained; grid division is carried out on a pipeline system of the hydrogen-related area to obtain a gridded pipeline system; a risk coefficient corresponding to each grid of the gridded pipeline system is determined according to leakage sources of the pipeline system; a high-risk region is determined by means of a jet cone model according to the risk coefficients; and a medium-risk region, a low-risk region and a safe region are determined according to the risk coefficients and the ventilation information. By means of the jet cone model, a spatial boundary region reaching a combustion threshold may be emphatically delimited in an extremely short time, the high-risk region may be determined, and the medium-risk region, the low-risk region and the safe region may be determined, so as to improve accuracy of risk level division of the hydrogen-related area. Risk early warning is carried out according to the high-risk region, the medium-risk region, the low-risk region and the safe region, so as to improve accuracy of risk early warning.

BRIEF DESCRIPTION OF THE DRAWINGS

In order to describe technical solutions in embodiments of the present disclosure or in the prior art more clearly, accompanying drawings required to be used in embodiments will be briefly introduced below. Apparently, accompanying drawings described below show merely some embodiments of the present disclosure, and those of ordinary skill in the art can also derive other accompanying drawings from these accompanying drawings without making creative efforts.

DETAILED DESCRIPTION OF THE EMBODIMENTS

Technical solutions in embodiments of the present disclosure will be clearly and completely described below in combination with accompanying drawings in the embodiments of the present disclosure. Apparently, the described embodiments are merely some embodiments rather than all embodiments of the present disclosure. On the basis of embodiments of the present disclosure, all other embodiments obtained by those of ordinary skill in the art without making creative efforts fall within the scope of protection of the present disclosure.

An objective of the present disclosure is to provide a risk early warning method and system for hydrogen leakage. A plurality of levels of risk regions are divided according to a speed at which hydrogen reaches a deflagration concentration range, so as to improve accuracy of risk level division of the hydrogen-related area, and further improve accuracy of risk early warning.

In order to make the above-mentioned objectives, features and advantages of the present disclosure more apparent and comprehensible, the present disclosure will be further described in detail below in combination with accompanying drawings and particular implementation modes.

Figure 1:
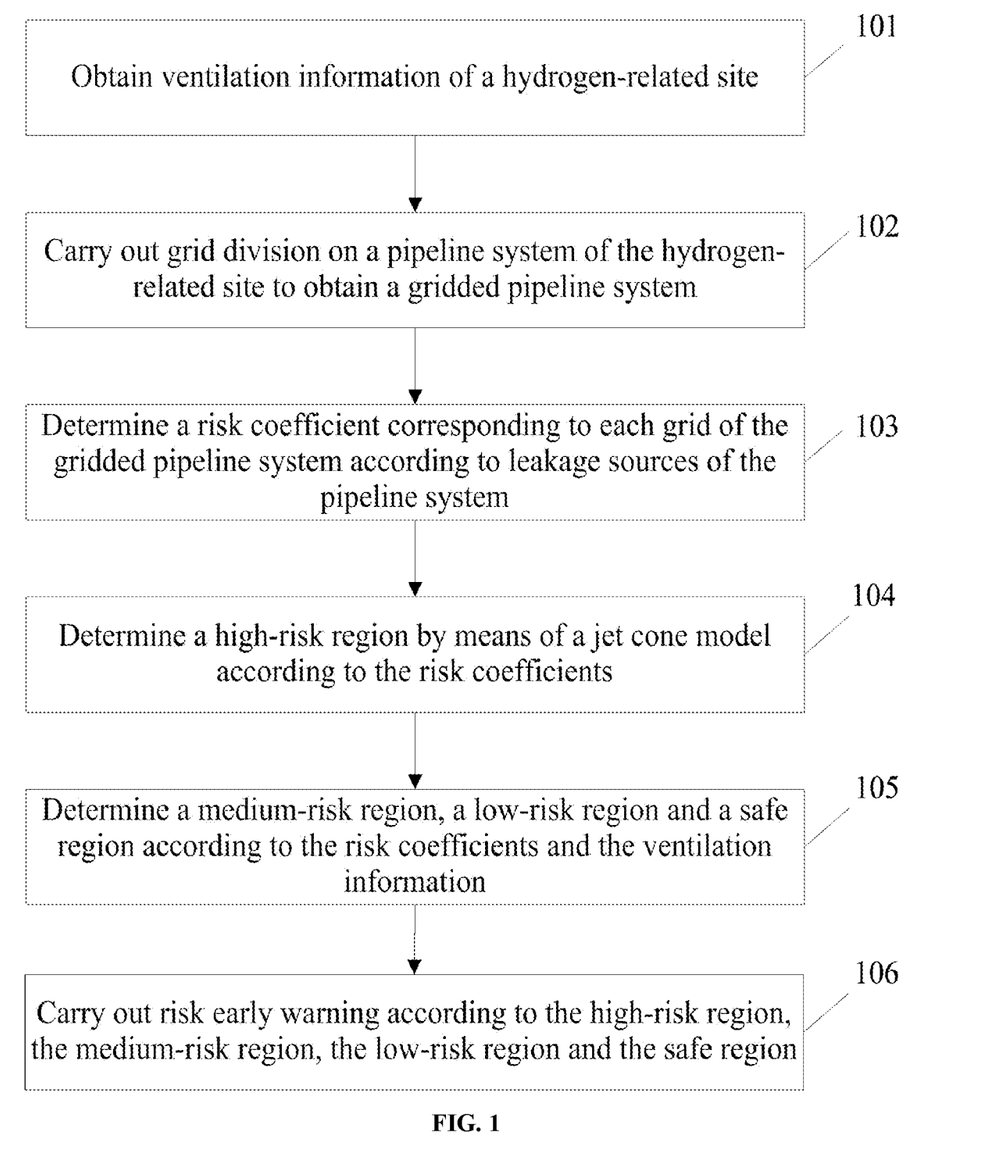
FIG. 1 is a flow diagram of a risk early warning method for hydrogen leakage according to the present disclosure.
Figure 2:
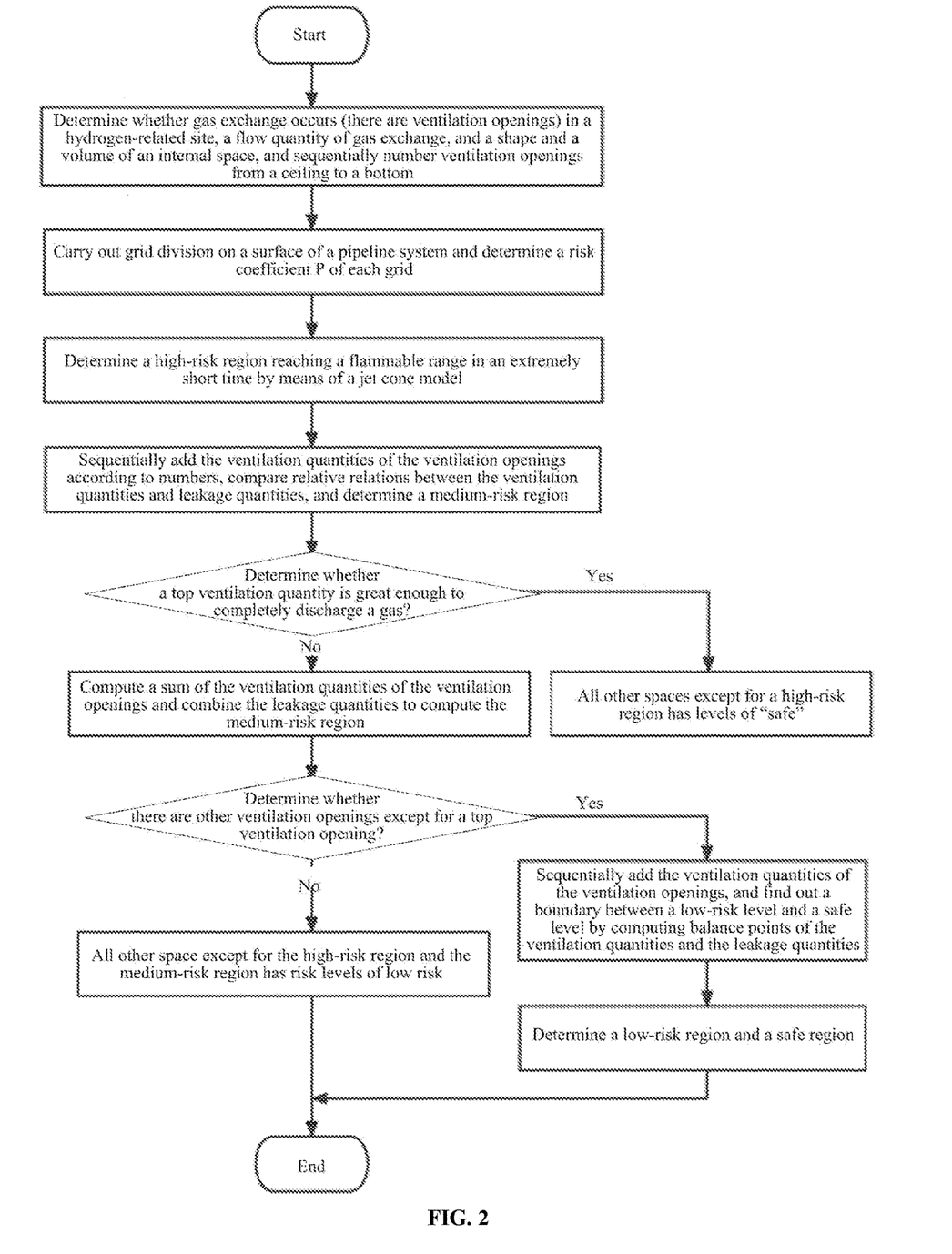
FIG. 2 is a flow diagram of a risk early warning method for hydrogen leakage according to the present disclosure during practical application.

An objective of the present disclosure is to provide a risk region division method for a hydrogen-related area (a hydrogen production workshop, a hydrogen fuel cell vehicle, etc.), such that a plurality of safety levels are set in the hydrogen-related area according to different risk degrees, so as to indicate different safety prevention and control priorities in a hydrogen-related space. As shown in FIGS. 1 and 2, a risk early warning method for hydrogen leakage provided in the present disclosure includes:

Step 101: obtain ventilation information of a hydrogen-related area. The ventilation information includes ventilation quantities of various ventilation openings, flow quantities of gas exchange, etc.

During practical application, ventilation openings of a hydrogen-related area are sequentially numbered from a ceiling to a bottom.

Step 102: carry out grid division on a pipeline system of the hydrogen-related area to obtain a gridded pipeline system.

Step 103: determine a risk coefficient corresponding to each grid of the gridded pipeline system according to leakage sources of the pipeline system. The step 103 specifically includes: obtain risk coefficients of the leakage source in each grid of the gridded pipeline system; and take a maximum risk coefficient of the leakage source in each grid as the risk coefficient corresponding to each grid.

A potential leakage source having a high risk level is determined. Researches show that positions of hydrogen storage vessels and pipelines the most likely to leak due to accidental cracking are weld seams, rusted positions and valve openings of the pipelines, while hydrogen storage vessel walls or pipeline walls having normal strength are difficult to damage and leak. Grid division is carried out on a surface of the entire pipeline system, whether the pipeline system conforms to features of a potential leakage source is determined according to Table 1, if yes, a risk coefficient P of the potential leakage source is further determined, and a risk coefficient table is as shown in Table 1.

TABLE 1

Risk Coefficient Table

| Position where grid is located | Risk coefficient |
| --- | --- |
| Vessel wall or pipe wall without abnormity | 0 |
| Weld seam of vessel or pipe | 1 |
| Threaded joint (subjected to explosion-proof sealing treatment) | 1 |
| Threaded joint (not subjected to explosion-proof sealing treatment) | 1.2 |
| Flange joint | 1.2 |
| Rusted position of vessel or pipe | 1.3 |
| Rusted weld seam of vessel or pipe | 1.5 |
| Valve opening | 2 |
| Hydrogen corroded position of vessel or pipe | 2 |

A grid having a risk coefficient that is not equal to 0 is marked and the risk coefficient thereof is recorded. If the grid on a boundary contains a region having more than one type of risk coefficients, the largest risk coefficient is taken as the risk coefficient of the grid, such that a relatively strict risk delimitation standard is used, and a final delimitation result has certain safety margin.

Step 104: determine a high-risk region by means of a jet cone model according to the risk coefficients. The step 104 specifically includes: determine hydrogen concentration distribution by means of the jet cone model according to the risk coefficients; and determine the high-risk region according to the hydrogen concentration distribution and the leakage sources. The high-risk region is the high-risk region in the figure.

A risk region having a risk level of high risk is determined. Each grid having a risk coefficient that is not equal to 0 is regarded as a risk point where leakage may occur, a risk region is divided according to a speed at which hydrogen reaches a combustion and explosion concentration (≥4%) range, and a high-risk region refers to a region where a flammable range may be reached in an extremely short time after a leakage accident occurs.

When a leakage accident occurs at a grid having a risk coefficient P, a hydrogen jet flow emitted from the grid may be described by means of the jet cone model. An empirical formula for determining a hydrogen concentration distribution by means of a jet cone model is $$k(r, z) = \frac{P}{1.7812 \times 10^{-3} z + 0.9335} e^{-0.643 \times 10^{-4} u_z^2 r^2} = K,$$

and the hydrogen concentration distribution expressed by the above formula is a relatively accurate formula for dividing a high-risk region. Since density of hydrogen is much less than that of air, a cone is a circular cone vertically inverted. In the formula, k is a percentage concentration of hydrogen at a certain point in a space, P is a risk coefficient of a grid, z is a longitudinal distance from a leakage opening, r is a radial distance from the leakage opening, and $u_z$ is a longitudinal velocity of a jet flow, which may be obtained through one-time leakage test. K is a risk concentration threshold of hydrogen, and may be generally set as 4%, or the threshold may be appropriately reduced to leave a safety margin.

A spatial curved surface may be computed by means of the empirical formula, a region within the curved surface is a space exceeding a risk concentration threshold, and after leakage occurs, a jet cone is almost instantaneously formed, such that the region is divided into a high-risk region. The entire high-risk region is formed by stacking jet cones corresponding to all grids having risk coefficients that are not equal to 0.

Particularly, under the condition that the accuracy requirement is not high, an empirical formula described in terms of angles may be used. In this way, It is more convenient to calculate the space exceeding the risk concentration threshold. In the case of a concentration threshold of 4%, a risk boundary of a single jet cone may be described as:

$$\frac{r}{z} = \frac{0.185}{u_z} P$$

A volume computation formula for a high-risk region may be written as:

$$V_1 = \sum \int \int_\Omega z(r, \theta) - \frac{r u_z}{0.185 P} dr d\theta$$

In the formula, double integral operation is carried out by means of a polar coordinate, a coordinate origin is a jet cone vertex, and r, θ are two integration variables; $V_1$ is a volume occupied by a high-risk level, Ω, is an integration domain, an area delimited by intersection lines of a ceiling and a jet cone is computed, and if jet cones overlap, the same area is not required to be repeatedly computed; and z(r, θ) is a curved surface equation of the ceiling.

Step 105: determine a medium-risk region, a low-risk region and a safe region according to the risk coefficients and the ventilation information.

The step 105 specifically includes:

determine whether a top ventilation quantity in the ventilation information is greater than a gas volume of the high-risk region to obtain a first determination result; determine, under the condition that the first determination result is yes, a region of the hydrogen-related area other than the high-risk region as the safe region; determine, under the condition that the first determination result is no, the medium-risk region according to the risk coefficient and the ventilation information; and determine the low-risk region and the safe region according to the medium-risk region, the high-risk region, an internal gas volume of the hydrogen-related area and the ventilation information.

The step of determining the low-risk region and the safe region according to the medium-risk region, the high-risk region, an internal gas volume of the hydrogen-related area and the ventilation information specifically includes:

determine whether the top ventilation quantity and a non-top ventilation quantity synchronously exist in the ventilation information to obtain a second determination result; determine, under the condition that the second determination result is no, a region of the hydrogen-related area other than the high-risk region and the medium-risk region as the low-risk region; and determine, under the condition that the second determination result is yes, the low-risk region and the safe region according to the internal gas volume of the hydrogen-related area and the ventilation information.

The step of determining the low-risk region and the safe region according to the internal gas volume of the hydrogen-related area and the ventilation information specifically includes: determine a total ventilation quantity according to a top ventilation quantity and a non-top ventilation quantity in the ventilation information; determine the low-risk region according to the total ventilation quantity and the risk coefficients; and determine the safe region according to the internal gas volume of the hydrogen-related area and the low-risk region.

A risk region having a risk level of medium risk is determined. Before this step is carried out, other elements required to be determined include gas exchange in a hydrogen-related area, a flow quantity of gas exchange, a shape and a volume of an internal space, etc. Since hydrogen will spontaneously gather to a roof, a ventilation quantity Q (unit: m³/s) of a ventilation opening is considered for division of a medium-safety region. The ventilation openings are sequentially numbered from a ceiling to a bottom, and a volume computation formula for a medium-risk region is:

$$V_2 = \int_0^T \left( \frac{u_z \sum PD^2}{K} - \sum_{i=1}^m Q_i \right) dt$$

In the formula, $V_2$ is a volume occupied by a medium-risk region; P is a risk coefficient of a grid; D is a side length of the grid; $u_z$ is a longitudinal velocity of a jet flow; K is a risk concentration threshold of hydrogen and is generally 4%; $Q_i$ is a ventilation quantity of an ith ventilation opening from top to bottom; and T is an alarm duration, that is, the case of reaching a concentration threshold within this time is considered as medium risk or above (under the condition that regions of a plurality of risk levels overlap, the risk is determined according to the highest risk level), and generally, the alarm duration may be set as one minute, and may be appropriately increased or decreased according to actual importance of target scenarios. m is the number of ventilation openings covered by the medium-risk region, and during actual computation, considering that the medium-risk region changes with time, m corresponds to the number of ventilation openings covered by the medium-risk region in a time element dt. According to this formula, a volume of a medium-risk region is computed first, so as to obtain a boundary between a medium-risk region and a low-risk region.

Particularly, under the condition that ventilation quantities of one or more ventilation openings at a top of a site are extremely great, for example, during actual computation, $$\frac{u_z \sum PD^2}{K} - Q_{Top} \leq 0$$

it is indicated that no hydrogen may accumulate at a ceiling, risk region division in this case does not include a medium-risk region, steps of determining a high-risk region and a low-risk region are not carried out, and risk levels in this case only include high risk and safety. $Q_{Top}$ is a top ventilation quantity. This formula is configured to determine whether hydrogen will accumulate at a ceiling.

A risk region having a risk level of low risk is determined. If there is a region determined to have a medium-risk level in a risk region determined to have a risk level is medium risk, and medium risk or above does not occupy the entire space, it is required to further divide a low-risk region. The low-risk region is defined as a space region where a hydrogen concentration may reach a combustion threshold in a long enough time. If at a closed space or an environment having a ventilation function only at a top, the remaining space is a low-risk region after a high-risk region and a medium-risk region are determined.

If there are a top ventilation opening and a non-top ventilation opening, a ventilation quantity and a leakage quantity are compared as computation of a medium-risk region, the ventilation quantities of the ventilation openings are added from top to bottom until a total ventilation quantity is greater than equivalent 4% mixed gas quantity of leakage.

$$\sum_{i=1}^{n-1} Q_i < \frac{u_z \sum PD^2}{K} \leq \sum_{i=1}^n Q_i.$$

This formula is used for dividing a low-safe region and a safe region. In this case, an n th ventilation opening is taken as a boundary, above which is a low-risk region, and below which is a safe region. A volume computation formula for a low-risk region is:

$$V_3 = \iint_S z'(x, y) = z''(x, y) dx dy$$

In the formula, z'(x, y) is a boundary between a medium-risk region and a low-risk region; z"(x, y) is a boundary between a low-safe region and a safe region, and if there is no obstacle blocking on the boundary, z"(x, y), should be a fixed value z'(x, y); and similarly, S is an area occupied by a hydrogen-related scenario.

After these four steps for risk region division, an region having a level of safety is determined, a space having a space risk level of safety has a volume $V_4=V-V_1-V_2-V_3$, and V is an effective volume of a hydrogen-related area (that is, a total space volume minus an apparatus pipeline volume).

Figure 3:
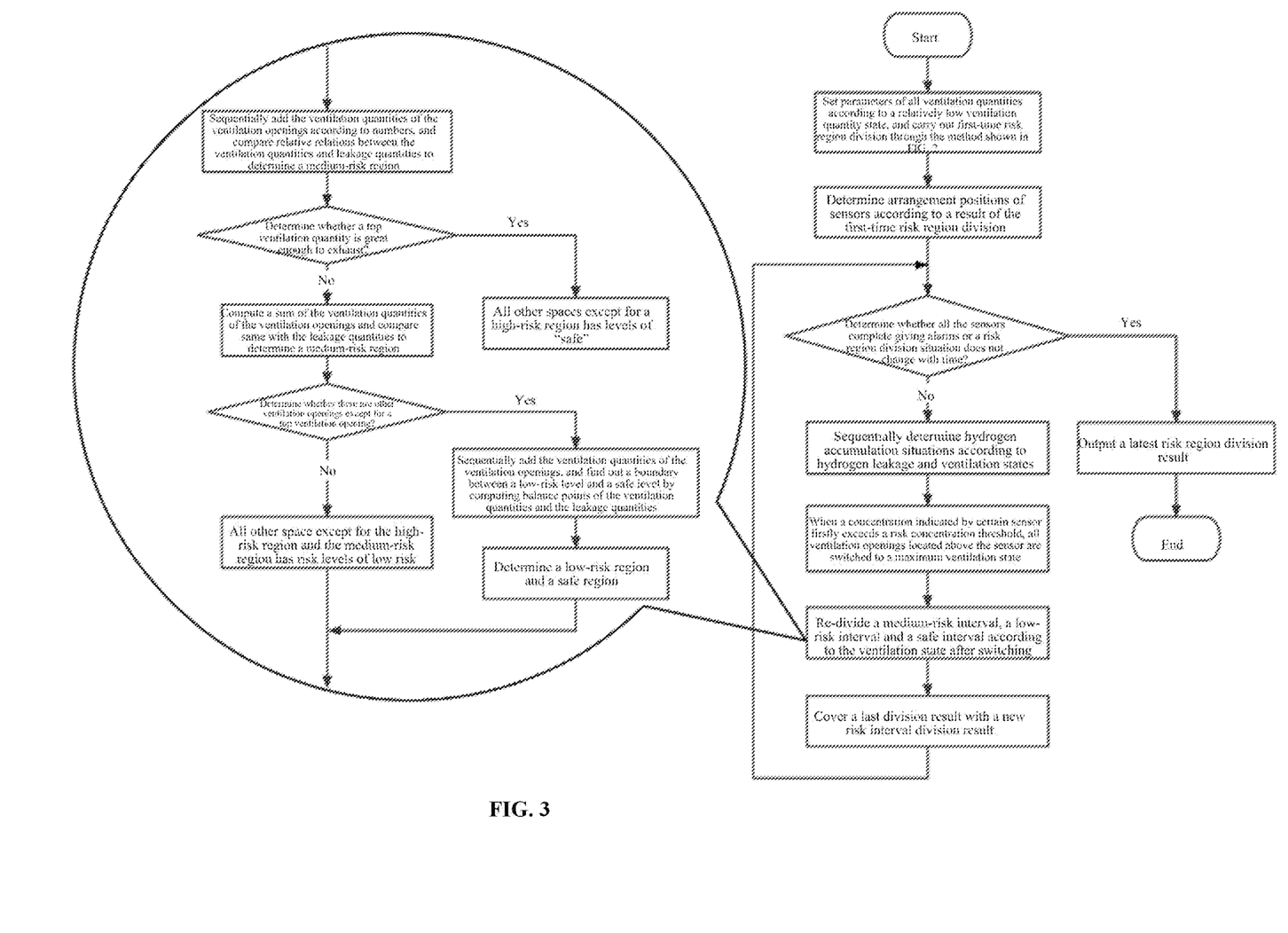
FIG. 3 is a flow diagram of risk region division of a hydrogen-related area having a flow-adjustable ventilation opening.

As shown in FIG. 3, in the case of a hydrogen-related scenario in which a ventilation opening has a ventilation quantity adjustment function, considering the energy saving requirement during operation in a safe state at ordinary times, it is not required to enable the ventilation opening to keep a ventilation state of a maximum ventilation quantity. Two operating states $L_1$ and $L_2$ of the ventilation opening may be set, $L_1$ corresponding to a lower ventilation state, and $L_2$ is a maximum ventilation state. A basis for switching ventilation states of the ventilation opening may be determined according to a concentration value measured by a concentration sensor or a volume proportion of a space of each risk level, and a determination method of a concentration sensor is taken as an example herein.

First-time risk region division should be carried out through a method mentioned above, and parameters of a ventilation opening should be set according to a state $L_1$, which is equivalent to a risk region computed according to a ventilation opening having a non-adjustable low ventilation quantity. Moreover, arrangement positions of sensors may be determined according to risk regions divided for the first time (generally, it is required to place at least one sensor in each of the medium-risk region and the low-risk region, and no sensor in a safe region). Whether all sensors complete giving alarms or a risk region division situation does not change with time is determined, if yes, a latest risk region division result is output, and if not, a hydrogen accumulation situation is determined in a chronological order according to hydrogen leakage and ventilation states. Assuming that a concentration indicated by certain sensor firstly exceeds a risk concentration threshold (typically 4% or less) after $t_1$, all ventilation openings located above the sensor are switched to a state $L_2$, discharge of risky gases is accelerated, and a volume proportion of a risky region is reduced. In this case, since a ventilation condition of a scenario changes, it is required to re-divide a risk region, and risk region division based on a ventilation state at a moment $t_1$ will cover an original division result. A leakage situation is continuously simulated and risk region division is updated in a chronological order until all sensors complete giving an alarm or a risk region division situation does not change with time.

Figure 4:
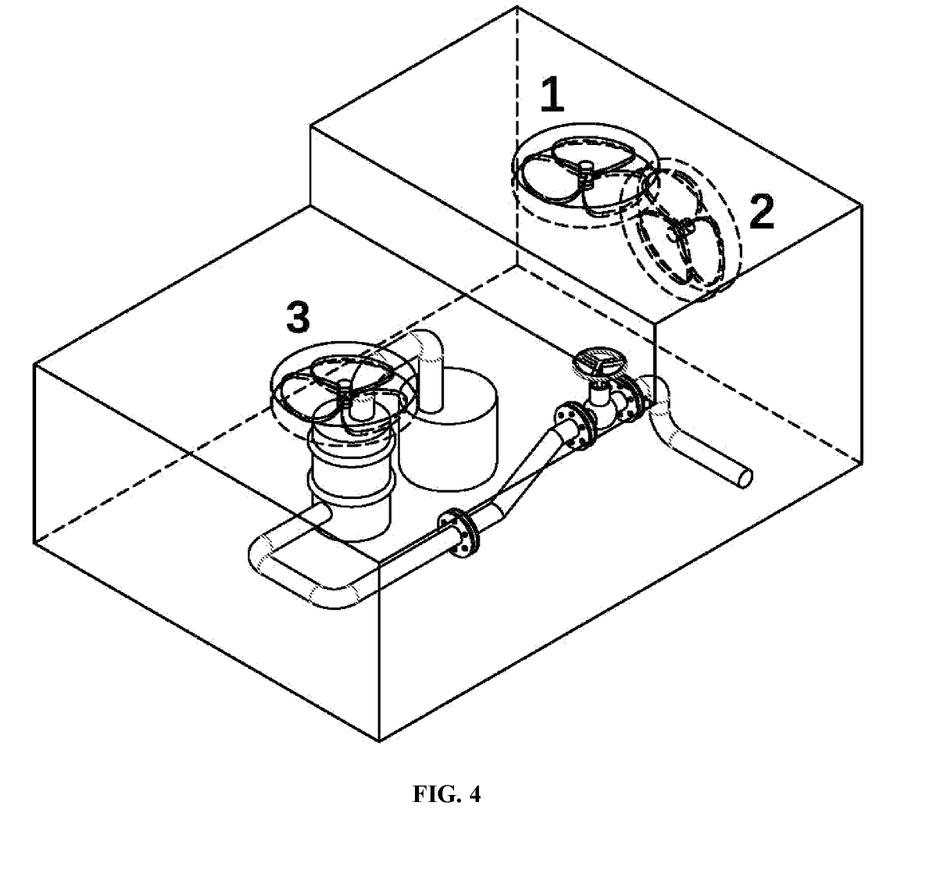
FIG. 4 is a schematic diagram of a hydrogen-related area and pipelines.

As shown in FIGS. 4-7, a hydrogen production workshop is taken as an example, it is determined that there are three ventilation openings in the scenario, and ventilation quantities thereof are the same. In the embodiment, a situation in which the three ventilation openings have adjustable flow quantities will be discussed. Assuming that when a ventilation opening is switched from a low ventilation state to a maximum ventilation state, a flow quantity thereof may change into 1.8 times an original flow quantity. The three ventilation openings are sequentially numbered from top to bottom, the ventilation opening on a top is a first ventilation opening, the ventilation opening on a side is a second ventilation opening, and the remaining ventilation opening is a third ventilation opening, as shown in FIG. 4. It's worth noting that since the third ventilation opening is approximately in a middle of the second ventilation opening, it is considered that when a flow quantity of the second ventilation opening reaches half of a maximum ventilation quantity in a current mode, the third ventilation opening will work.

Figure 5:
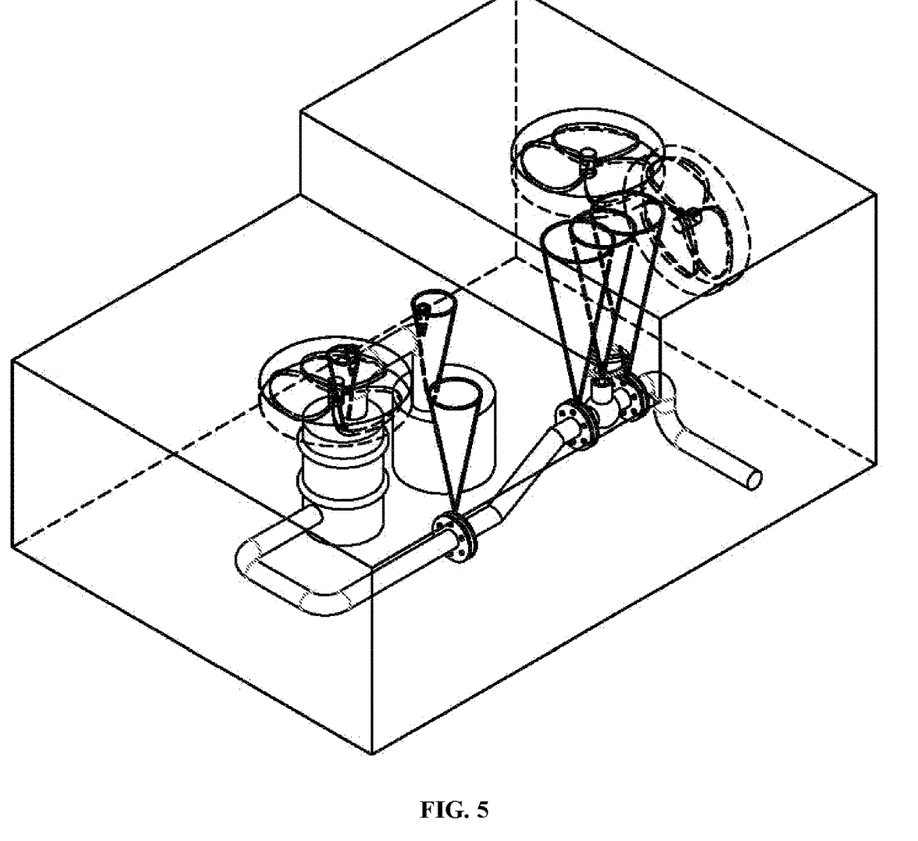
FIG. 5 is a schematic diagram of a high-risk region.

First, all the ventilation openings are defaulted to be in a low ventilation state, and first-time risk region division is carried out. Grid division is carried out a surface of a hydrogen pipeline according to Table 1 and a risk factor of each grid is determined. A jet cone is made from each grid having a risk factor that is not equal to 0 to a wall or a ceiling, as shown in FIG. 5. Only part of a jet cone is shown in the figure for illustration, and a black region in the figure is a spatial range having a risk level of "high risk".

Figure 6:
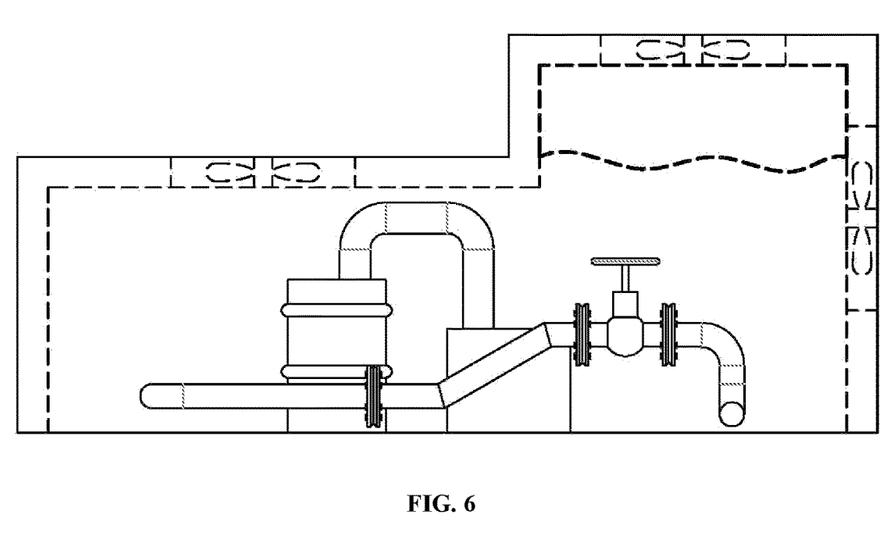
FIG. 6 is a schematic diagram of a medium-risk region.

A risk concentration threshold of hydrogen is set as 4% and an alarm duration is set as one minute, a relation between a leakage quantity and a ventilation quantity is computed according to the formula, firstly, it is determined that the first ventilation opening at a top is insufficient to completely exhaust the risky gas, further, it is determined that the risky gases will only gather in a higher square space in the figure, and after the alarm duration, only 1.2 times a ventilation flow quantity of a single ventilation opening is started, and the third ventilation opening does not work. A spatial range having a risk level of "medium risk" is as shown in FIG. 6.

Figure 7:
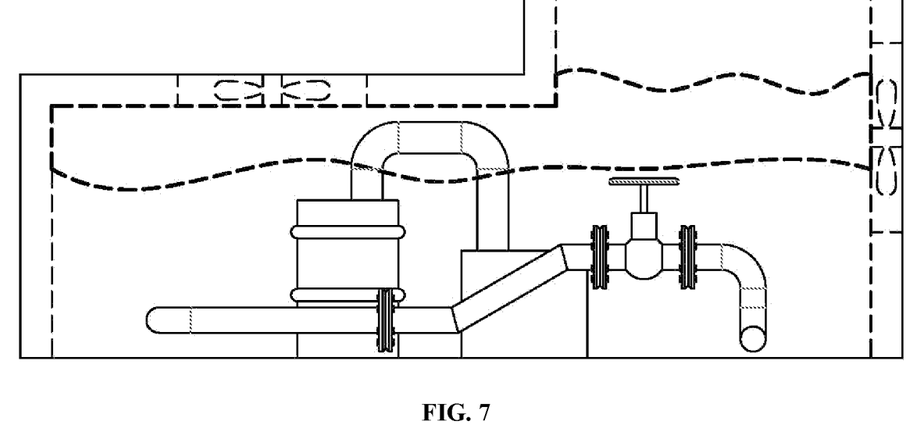
FIG. 7 is a schematic diagram of a low-risk region.

Similarly, a risk concentration threshold of hydrogen is set as 4%, ventilation quantities of ventilation openings are sequentially added, and a balance relation between a ventilation quantity and a leakage quantity is computed, such that it is required to start a ventilation quantity 2.7 times a ventilation quantity of a single ventilation opening to balance a leakage quantity. In this case, the first and third ventilation openings and part of the second ventilation opening are in effective states. The boundary between a low-risk region and a safe region may be obtained, and a spatial range having a risk level of "low risk" may be determined, as shown in FIG. 7. Further, the remaining space is a spatial range having a risk level of "safety".

Figure 8:
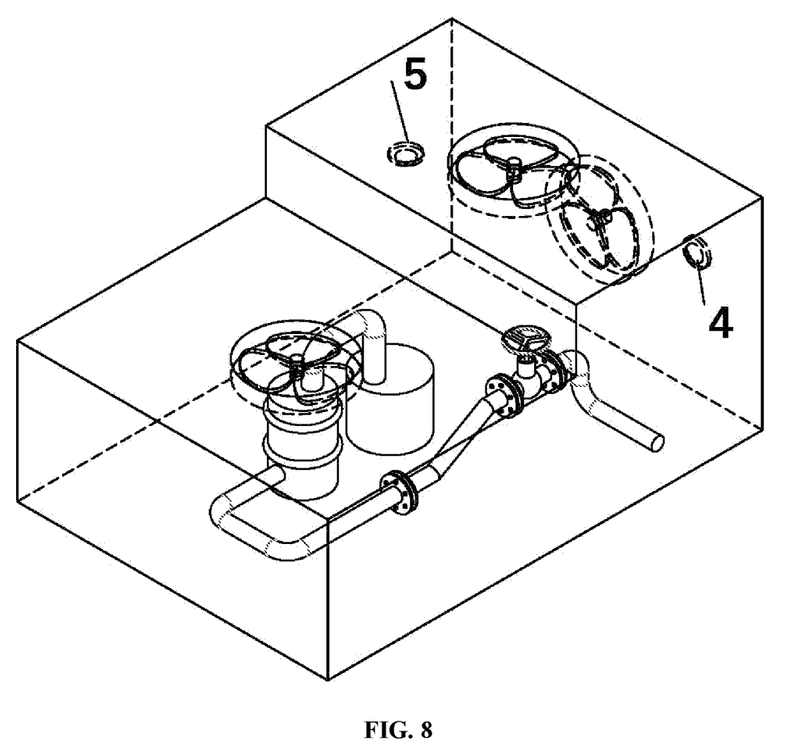
FIG. 8 is an arrangement position diagram of hydrogen concentration sensors.

Under the condition that a ventilation opening has an adjustable flow quantity, it is required to determine arrangement positions of hydrogen concentration sensors on the basis of first-time risk region division. In the embodiment, it is determined to arrange one hydrogen concentration sensor in each of the medium-risk region and the low-risk region, and a risk concentration threshold is set as 4%, and if the risk concentration threshold is exceeded, an alarm will be given and serve as a basis for adjusting a ventilation mode of a ventilation opening. Arrangement positions of sensors are as shown in FIG. 8.

Figure 9:
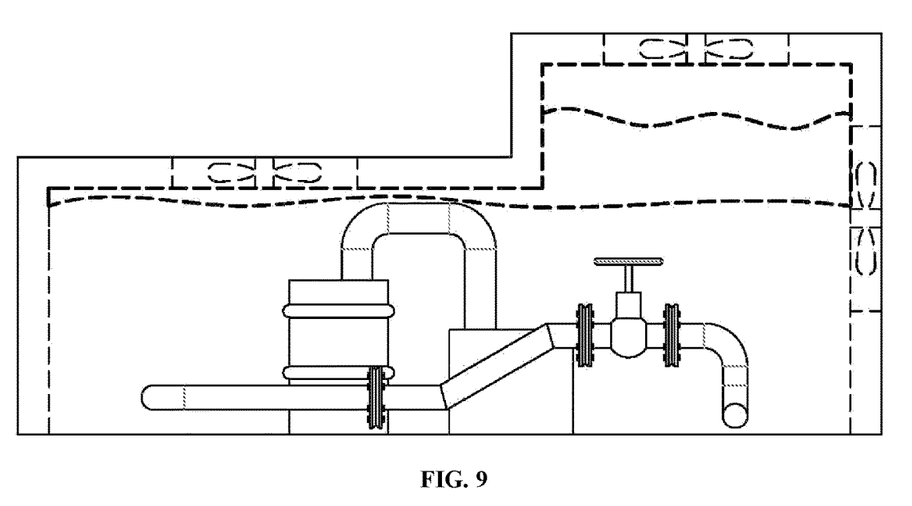
FIG. 9 is a second-time risk region division diagram.

Since a first sensor 5 is arranged on a roof, the sensor will give an alarm almost immediately if hydrogen leakage occurs. In this case, a ventilation quantity of the first ventilation opening changes into 1.8 times a normal ventilation quantity, and ventilation quantities of second and third ventilation openings remain unchanged. According to the same steps, a risk region division result in this case is computed, as shown in FIG. 9 (a high-risk region is not drawn again if there is no change).

Figure 10:
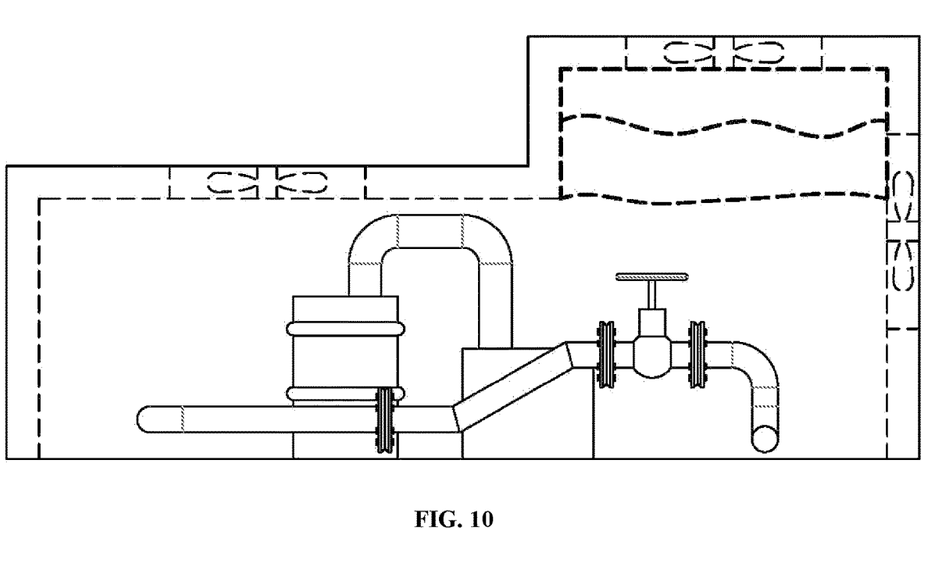
FIG. 10 is a third-time risk region division diagram.

The second sensor 4 is arranged at a position higher than a center line of the second ventilation opening, and although an air quantity of the first ventilation opening is increased, with the accumulation of hydrogen, the second sensor 4 still reaches a risk threshold. In this case, all ventilation openings work in a maximum flow state, and a risky region is further reduced, as shown in FIG. 10. Then, due to an increase in a ventilation quantity, a risky region of hydrogen does not continue to expand as time passes, and an end condition is reached, such that FIG. 10 is a final risk region division diagram.

Step 106: carry out risk early warning according to the high-risk region, the medium-risk region, the low-risk region and the safe region.

A multi-level alarm method is proposed for spatial regions having different risk levels, and subdivided alarm levels of high-risk, medium-risk and low-risk levels are computed according to a formula as follows:

$$I_j = \frac{V_j}{V_{\varphi_i}}.$$

$I_j$ is importance of an alarm level, $I_j$ that is less than 0.3 corresponds to a III-level alarm of the risk level, $I_j$ that is between 0.3 and 0.7 corresponds to a II-level alarm, and $I_j$ that is greater than 0.7 corresponds to a I-level alarm. $V_j$ corresponds to a volume of high-risk, medium-risk and low-risk regions, $\varphi_j$ is a volume coefficient, which is 1 when low risk is computed, and is required to be appropriately reduced when medium risk and high risk are computed, for example, is 0.5 and 0.1 respectively. Assuming that a result of certain risk region division is that a high-risk region has a volume proportion of 5%, a medium-risk region has a volume proportion of 20%, a low-risk region has a volume proportion of 25%, and a safe region has a volume proportion of 50%. Then, after computation, an II-level high-risk alarm, an II-level medium-level alarm and an III-level low-level alarm should be simultaneously given.

The present disclosure further provides a risk early warning system for hydrogen leakage. The system includes:

an obtainment module configured to obtain ventilation information of a hydrogen-related area;

a grid division module configured to carry out grid division on a pipeline system of the hydrogen-related area to obtain a gridded pipeline system;

a risk coefficient determination module configured to determine a risk coefficient corresponding to each grid of the gridded pipeline system according to leakage sources of the pipeline system;

a high-risk region determination module configured to determine a high-risk region by means of a jet cone model according to the risk coefficients;

a medium-risk region, low-risk region and safe region determination module configured to determine a medium-risk region, a low-risk region and a safe region according to the risk coefficients and the ventilation information; and an early warning module configured to carry out risk early warning according to the high-risk region, the medium-risk region, the low-risk region and the safe region.

Preferably, the risk coefficient determination module specifically includes: an obtainment unit configured to obtain risk coefficients of the leakage source in each grid of the gridded pipeline system; and a risk coefficient determination unit configured to take a maximum risk coefficient of the leakage source in each grid as the risk coefficient corresponding to each grid.

According to the present disclosure, in the case of hydrogen-related areas such as a hydrogen production workshop and a hydrogen fuel cell vehicle, it is required to consider a risk of hydrogen leakage so as to divide a risk level of the hydrogen-related space, thereby guiding safety early warning and deployment of hydrogen. According to the present disclosure, a plurality of levels of risk regions are divided according to different speeds of hydrogen reaching a combustion and explosion concentration range, and a risk level of the hydrogen-related area may be stepwise expressed, which has the advantages of simplicity, convenience, easily use, accuracy and high efficiency. In order to divide a high-risk region, according to the present disclosure, by means of a jet cone model summarized through experiments, a spatial boundary region which may reach a combustion threshold in an extremely short time may be emphatically delimited, which is not considered in other risk region division methods. In this way, a spatial range having extreme inflammable and explosive risks may be separately and emphatically prevented, a division basis is clear, computation is relatively fast, and a risk region may be more accurately determined, thereby improving accuracy of early warning.

Each embodiment of the description is described in a progressive manner, each embodiment focuses on differences from other embodiments, and for the same and similar parts between the embodiments, references can be made to each other. Since the system disclosed in embodiments corresponds to the method disclosed in embodiments, the description is simple, and reference can be made to the description of the method.

In the description, principles and implementation modes of the present disclosure are illustrated through particular embodiments, and the description of the above embodiments is only used for helping understand the method in the present disclosure and the core ideas thereof. Moreover, those of ordinary skill in the art can make various changes in terms of particular implementation modes and the scope of application in accordance with the ideas of the present disclosure. In conclusion, the content of the description should not be construed as a limitation to the present disclosure.

What is claimed is:

1. A risk early warning method for hydrogen leakage, comprising:

obtaining ventilation information of a hydrogen-related area;

carrying out grid division on a pipeline system of the hydrogen-related area to obtain a gridded pipeline system;

determining a risk coefficient corresponding to each grid of the gridded pipeline system according to leakage sources of the pipeline system;

determining a high-risk region by means of a jet cone model according to the risk coefficients; wherein the determining the high-risk region by means of the jet cone model according to the risk coefficients comprises:

determining hydrogen concentration distribution by means of the jet cone model according to the risk coefficients; and determining the high-risk region according to the hydrogen concentration distribution and the leakage sources; wherein an empirical formula for determining the hydrogen concentration distribution by means of the jet cone model is $$k(r, z) = \frac{P}{1.7812 \times 10^{-3} z + 0.9335} e^{-0.643 \times 10^{-4} u_z^2 r^2} = K,$$

wherein k is a percentage concentration of hydrogen at a certain point in a space, P is a risk coefficient of a grid, z is a longitudinal distance from a leakage opening, r is a radial distance from the leakage opening, $^u z$ is a longitudinal velocity of a jet flow, and K is a risk concentration threshold of hydrogen;

determining a medium-risk region, a low-risk region and a safe region according to the risk coefficients and the ventilation information; wherein the determining the medium-risk region, the low-risk region and the safe region according to the risk coefficients and the ventilation information comprises:

determining whether a top ventilation quantity in the ventilation information is greater than a gas volume of the high-risk region to obtain a first determination result;

determining, under the condition that the first determination result is yes, a region of the hydrogen-related area other than the high-risk region as the safe region;

determining, under the condition that the first determination result is no, the medium-risk region according to the risk coefficient and the ventilation information; and determining the low-risk region and the safe region according to the medium-risk region, the high-risk region, an internal gas volume of the hydrogen-related area and the ventilation information; wherein the determining the low-risk region and the safe region according to the medium-risk region, the high-risk region, an internal gas volume of the hydrogen-related area and the ventilation information comprises:

determining whether the top ventilation quantity and a non-top ventilation quantity synchronously exist in the ventilation information to obtain a second determination result;

determining, under the condition that the second determination result is no, a region of the hydrogen-related area other than the high-risk region and the medium-risk region as the low-risk region; and determining, under the condition that the second determination result is yes, the low-risk region and the safe region according to the internal gas volume of the hydrogen-related area and the ventilation information; and carrying out risk early warning according to the high-risk region, the medium-risk region, the low-risk region and the safe region.

2. The risk early warning method for hydrogen leakage according to claim 1, wherein the determining a risk coefficient corresponding to each grid of the gridded pipeline system according to leakage sources of the pipeline system comprises:

obtaining the risk coefficients of the leakage sources in each grid of the gridded pipeline system; and taking a maximum risk coefficient of the leakage sources in each grid as the risk coefficient corresponding to each grid.

3. The risk early warning method for hydrogen leakage according to claim 1, wherein the determining the low-risk region and the safe region according to the internal gas volume of the hydrogen-related area and the ventilation information comprises:

determining a total ventilation quantity according to the top ventilation quantity and the non-top ventilation quantity in the ventilation information;

determining the low-risk region according to the total ventilation quantity and the risk coefficients; and determining the safe region according to the internal gas volume of the hydrogen-related area and the low-risk region.

\* \* \* \* \*